United States Patent [19]

Kraft

[11] Patent Number: 4,759,433

[45] Date of Patent: Jul. 26, 1988

[54] CONTINUOUS MOTION, IN-LINE PRODUCT STACKING APPARATUS

[75] Inventor: Kenneth R. Kraft, Roberts, Wis.

[73] Assignee: Doboy Packaging Machinery, Inc., New Richmond, Wis.

[21] Appl. No.: 907,240

[22] Filed: Sep. 15, 1986

[51] Int. Cl.[4] ............................................. B65G 57/00
[52] U.S. Cl. ................................................. 198/422
[58] Field of Search ................................ 198/422, 423

[56] References Cited

U.S. PATENT DOCUMENTS

| | | |
|---|---|---|
| 2,324,930 | 7/1943 | Joa . |
| 2,822,932 | 2/1958 | Patrick . |
| 3,288,269 | 11/1966 | Roth et al. . |
| 3,389,531 | 6/1968 | Ehe et al. . |
| 3,391,777 | 7/1968 | Joa ........................................ 198/422 |
| 3,470,674 | 10/1969 | Madonia . |
| 3,880,059 | 4/1975 | Brockmüller . |
| 4,042,125 | 8/1977 | Falkinger et al. . |
| 4,120,406 | 10/1978 | During . |
| 4,239,433 | 12/1980 | Hanson ................................. 198/422 |
| 4,285,621 | 8/1981 | Spencer . |
| 4,307,800 | 12/1981 | Joa ........................................ 198/422 |
| 4,413,462 | 11/1983 | Rose . |
| 4,450,949 | 5/1984 | Buschor et al. ....................... 198/422 |
| 4,553,668 | 11/1985 | James et al. ........................... 206/391 |
| 4,646,908 | 3/1987 | Gambetti ............................... 198/422 |

*Primary Examiner*—Randolph A. Reese
*Assistant Examiner*—Anthony Knight
*Attorney, Agent, or Firm*—Haugen & Nikolai

[57] ABSTRACT

A continuous motion, in-line stacker for positioning products, one atop the other, as the products are being conveyed from a product supply point to a high-speed wrapping machine. The stacker assembly comprises a supply conveyor which is in longitudinal alignment with a downstream stacking conveyor and a discharge conveyor. The stacking conveyor has an endless belt or chain which is trained over a series of idler rollers or sprockets so as to form an ascending flight, a horizontal flight, a descending flight and a return flight. Secured to the stacking conveyor's belt or chain at predetermined spacings therealong are a series of product platens of predetermined differing heights. In the zone of the horizontal flight are a series of vertically arranged, horizontally extending deadplates whose vertical spacings correspond to the heights of the product platens. As the products move along the supply conveyor, they are intercepted by the product's platens as they move along the ascending flight and are deposited on the deadplates in sequence. Also affixed to the stacker conveyor's belt or chain are a series of pusher fingers which cooperate with the products resting on the deadplates to move those products in unison off the deadplates and onto the descending flight of the stacker conveyor to be picked up by the discharge conveyor. In moving off the deadplates in unison, the products become stacked one atop the other.

5 Claims, 1 Drawing Sheet

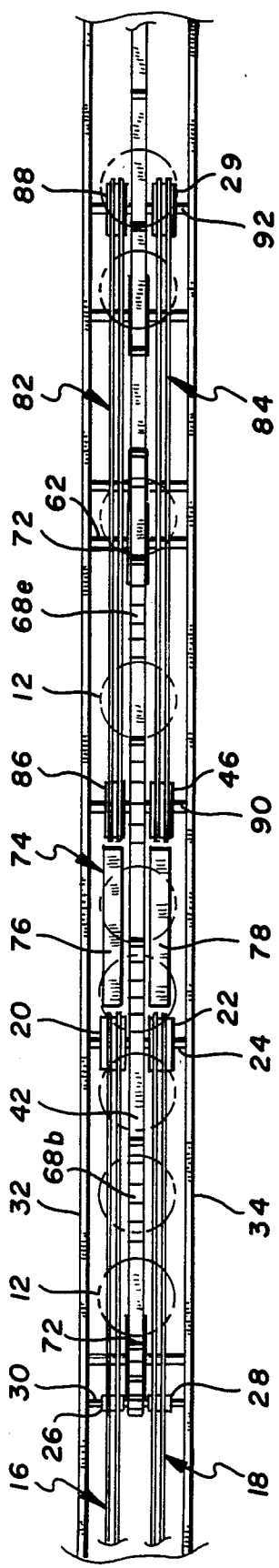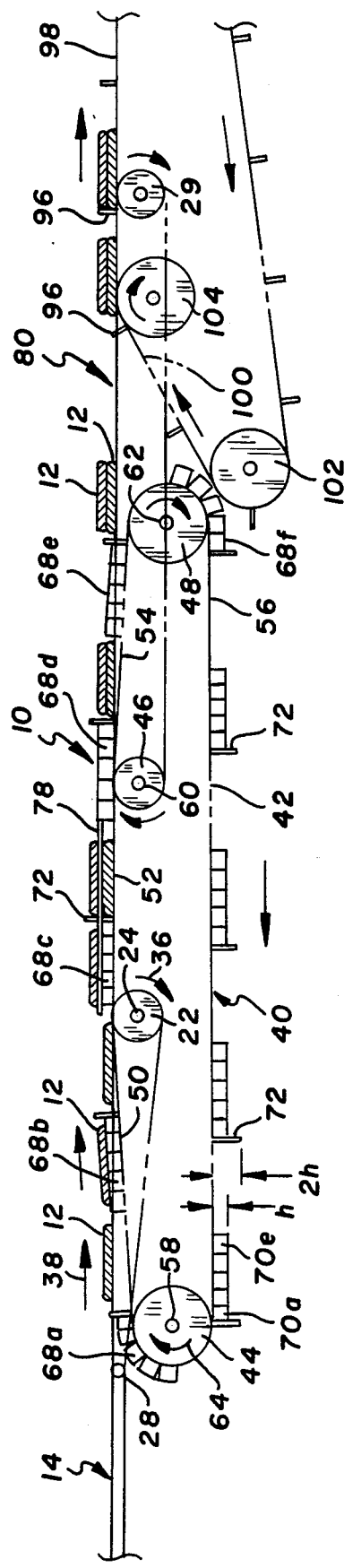

CONTINUOUS MOTION, IN-LINE PRODUCT STACKING APPARATUS

BACKGROUND OF THE INVENTION

I. Field of the Invention:

This invention relates generally to materials handling apparatus, and more specifically to an improved means for stacking products one atop the other as they are transported from a supply station to a wrapping station.

II. Discussion of the Prior Art:

In packaging products for distribution, it is sometimes desired that the products be arranged in layers or stacks prior to being wrapped in plastic film, foil or paper. For example, bakery items such as cookies, buns, confectionary items, etc., are often stacked two, three or more high in a tray or box prior to being enveloped in a suitable film wrapper. Similarly, frozen meat or fish patties are often stacked prior to being wrapped. It is, of course, desirable that the stacking operation be automated and that the stacks be created and transported to the wrapping station at a speed compatible with the overall speed of the supply source and the high-speed wrapper. To avoid the need for machine shut-down or intermittent operation, it is imperative that the stacking system not only work continuously at high speeds, but in a reliable fashion and without damage to the products being stacked.

In the Joa U.S. Pat. No. 2,324,930, there is depicted an arrangement for receiving products in serial order and creating a stack of a predetermined height which involves a vertically oriented conveyor, having a plurality of outwardly projecting arms secured thereto, positioned downstream from and adjacent to a horizontally extending product supply conveyor. The vertically-oriented conveyor is synchronized with the supply conveyor such that, as an arm on the vertical conveyor passes by the end of the supply conveyor, a product is discharged from the supply conveyor onto the arm and carried upward prior to turning 180° and descending. Also included is a synchronized discharge conveyor having a plurality of pushers affixed thereto, the pushers being of a predetermined height so as to simultaneously engage a plurality of products on adjacent arms of the vertical stacking conveyor. As the discharge conveyor moves, the pusher fingers engage a stack of products on the arms and urges them free of these arms.

Another machine for accomplishing a similar end. i.e., stacking products, is disclosed in the Rose U.S. Pat. No. 4,413,462. In the case of this machine, sandwiched cookies are delivered from a conventional sandwiching machine and stacked into two-high stacks before being transported to a wrapping machine. In this machine, first and second rows of cookies leaving the sandwiching machine are transported along parallel conveyor branches, with one such branch being elevated relative to the other and offset therefrom in a side-by-side relationship. The upper branch has a diverter which extends obliquely to a point where its end overlies the lower conveyor. As the respective products move along their respective conveyor branches, a point is reached where the two conveyors merge in a common vertical plane allowing cookies discharged from the uppermost conveyor to come to rest on top of other cookies progressing along the lower conveyor.

While the machines described in the aforereferenced Joa and Rose patents function to stack product prior to wrapping, in each instance, the machines in question are unduly complicated and would appear to be subject to severe problems in terms of maintaining synchronization over prolonged periods of operation. It is the purpose of the present invention to obviate such problems.

SUMMARY OF THE INVENTION

In accordance with the present invention, a stack of products is created without the necessity of changing the general direction of travel of the products as they progress from a supply source to the wrapping station. More particularly, and in contrast with the above described prior art machines, the product flow remains in a longitudinal direction and the respective conveyors comprising the system operate in a continuous flow mode.

The system of the present invention can be considered as a continuous motion, in-line stacker capable of receiving product from a supply station, creating a vertical stack of such products, and transporting the stack to the infeed conveyor of a high-speed wrapping machine. It comprises a supply conveyor which is in longitudinal alignment with, first, a downstream stacking conveyor and, second, with a discharge conveyor. The supply conveyor provides products to the stacking conveyor in a synchronized, serial sequence. The stacking conveyor includes an endless belt or chain which is trained over a series of idler rollers or sprockets so as to form an ascending flight, a horizontal flight followed by a descending flight in the direction of product movement. Secured to the stacking conveyor's belt or chain at predetermined spacings from one another are a series of product platens of predetermined height dimension or dimensions. The spacing between and length of adjacent product platens is a function of the length dimension of the product being stacked.

Associated with the zone involving the horizontal flight of the stacking conveyor are a series of vertically spaced, horizontally extending deadplates. The spacing between adjacent deadplates is determined by the product's thickness and the height of the product platens.

As the products move along the supply conveyor, they are intercepted by the product platens as they move along the ascending flight of the stacking conveyor's belt or chain and are deposited on the stationary deadplate(s) in sequence. Also affixed to the stacker conveyor's belt or chain are a series of pusher fingers which cooperate with the products resting on the deadplate(s) to move those products in unison off the deadplate(s) and onto the descending flight of the stacker conveyor to be picked up by the discharge conveyor. Because the products are moved free of the stationary deadplates in unison, they assume a stacked relationship on the descending flight and later on the discharge conveyor.

The system of the present invention stacks the product with continuous motion while traveling along a single longitudinal axis and without the need for cams, intermittent motion, cyclic diverters or any other type of start/stop motion. As such, the system is capable of operating at substantially higher speeds than known prior systems.

OBJECTS

It is accordingly a principal object of the present invention to provide a new and improved system for conveying products from a supply source to a wrapping machine while simultaneously creating a vertical stack of such products.

Another object of the invention is to provide a system for stacking products which does not require intermittent operation of the conveyor drive motors.

Still another object of the invention is to provide a product stacker in which the product flow remains aligned with the longitudinal axes of the conveyors employed in the system, there being no need for a sudden change in the direction of the product flow.

A still further object of the invention is to provide a high-speed conveyor/stacker mechanism which is reliable in its operation over prolonged periods of time and without the need of frequent adjustment to maintain its operating elements in synchronization.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a schematic top or plan elevation of the product stacking apparatus of the present invention; and FIG. 2 is a schematic mechanical representation of the side elevation of the product stacking apparatus.

Referring simultaneously to both FIGS. 1 and 2, there is illustrated generally by numeral 10 a continuous motion, in-line stacker in accordance with the present invention. For illustrative purposes only, the invention will be described in connection with an application in the baking industry wherein it is desired to create stacks of cookies prior to their being wrapped by a high-speed horizontal wrapping machine, such as the SUPER-H® or SERVOTRONIC® wrappers (not shown) manufactured and sold by Doboy Packaging Machinery, Inc., of New Richmond, Wis., the assignee of the instant application.

In the figures, the cookie products are identified by numeral 12. It is to be understood, however, that the present invention is not limited to this particular application, but, in fact, can be used for stacking a wide variety of products as those skilled in the art can appreciate, following a reading of the instant patent specification.

The in-line stacking/conveying system, indicated generally by numeral 10, is seen to comprise a supply conveyor 14, which includes a first pair of endless bands 16 and a second pair of endless bands 18 trained about idler rollers 20 and 22 affixed to a common shaft 24. The rollers 20 and 22 are spaced laterally with respect to one another such that the pairs of bands 16 and 18 are likewise spaced laterally with respect to one another. The lateral spacing between adjacent pairs of bands is maintained by virtue of the fact that the bands are also trained about idler rollers 26 and 28 affixed to the shaft 30 which, like shaft 24, is journaled for rotation between the frame plates 32 and 34.

The band spacing is determined by the width of the product being transported. The sets of endless bands or belts 16 and 18 are adapted to be driven in the direction indicated by the arrow 36 (FIG. 2) and, as such, product 12 resting on those bands will move in the direction indicated by the arrow 38.

In addition to the supply conveyor 14, the continuous motion in-line stacker 10 also includes a stacking conveyor which is indicated generally by numeral 40. It is seen to comprise an endless belt or chain 42 which is trained about rollers or sprockets 44, 22, 46 and 48 to define an ascending flight 50, a horizontal flight 52, a descending flight 54, and a return flight 56. The rollers or sprockets 44, 46 and 48, like the roller or sprockets 20–22 and 26–28 are affixed to transversely extending shafts 58, 60 and 62 which are generally parallel to one another and which are journaled for rotation between the frame plates 32 and 34. Because the shaft 58 is at a somewhat lower elevation on the frame than its next adjacent shaft 24, and because the stacker conveyor belt or chain 42 is driven by a motor (not shown) to move in the direction of the arrow 64, the flight 50 is inclined upwardly and to the right at an angle in the range of about 3 to 10 degrees relative to the horizontal in the view of FIG. 2. Similarly, because the shaft 62 of the wheel or sprocket 48 is mounted below the shaft 60 associated with the roller or sprocket 46, as the belt or chain 42 is driven in the direction of the arrow 64, the flight 54 is descending relative to the horizontal in FIG. 2. As can best be seen in the plan view of FIG. 1, the stacker conveyor belt or chain 42 is disposed approximately midway between the sets of parallel bands 16 and 18 comprising the supply conveyor 14.

In describing the present invention, the devices are configured to create a two-high stack of cookies 12. Those skilled in the art will, however, readily visualize how the principles of the invention may be extended to create stacks of products which are greater than two high.

Affixed to the chain or belt 42 comprising the stacker conveyor are a series of product platens 68 which, in the illustrated embodiment, are each of the same height dimension, h, (FIG. 2). Each of the platens 68 is spaced from its adjacent neighbor by a distance only slightly greater than the length dimension of the product 12 being transported. As shown in the drawings, the product platens 68 must be able to pass around the rollers or sprockets 44 and 48 and, as such, may conveniently comprise a series of separate or hinged blocks 70a through 70e each of a height (h), affixed to the belt or chain 42. Secured to the leading block 70a of each of the product platens 68 is a pusher finger 72 which projects generally at rights angles to the belt 42 and which is substantially of a height 2h (FIG. 2). Positioned above and parallel to the horizontal flight 52 of the stacker conveyor 40 by means of standoffs (not shown) is a deadplate 74 comprised of first and second coplanar sheets 76 and 78 of stainless steel or other suitable material. The height of the standoffs is such that the undersurface of the deadplate members 76 and 78 is of a higher elevation relative to the horizontal conveyor flight 52 than is the upper surface of the product being transported. Because of the transverse spacing between the inner side edges of the dead plate members 76 and 78, there is sufficient clearance for the pusher member 72 to pass therebetween.

Associated with the descending flight 54 of the stacking conveyor is a discharge conveyor which is indicated generally by numeral 80. Like the supply conveyor 16, the discharge conveyor comprises first and second sets or pairs of endless bands 82 and 84 which extend around a first pair of rollers or sprockets including rollers or sprockets 86 and 88 and 90 and 92.

These spaced apart conveyor belt pairs permit the descending flight 54 of the stacker conveyor to pass therebetween as it passes around the roller 62 to become the return flight 56. The rollers or sprockets 46 and 29 and their corresponding transverse shafts 90 and 92 are journaled for rotation in bearings (not shown) supported in the side frame plate members 32 and 34 are at the same elevation and, as such, the upper flight of the discharge conveyor 80 travels in a generally horizontal direction, carrying the stacked products toward the right when viewed as in FIG. 2 where the stacked products are intercepted by the pusher fingers 96 affixed to the wrapper's infeed chain conveyor 98. The infeed chain conveyor 98 is longitudinally disposed relative to the discharge conveyor 80 so that the lugs 96 thereon pass between the parallel sets of endless bands 82 and 84 and they traverse the ascending flight 100 of the infeed conveyor 98 which extends between the sprocket wheels 102 and 104. Discharge conveyor 80 could utilize or be comprised of a flighted chain if better product control is necessary due to difficult-to-handle products.

Arrival of products on the supply conveyor 14 can be synchronized with the ascending flight 50 of the stacking conveyor 10 using the apparatus and method described in the Ziller U.S. Pat. No. 4,553,368, assigned to the assignee of the instant application. By driving it mechanically and in time with the stacker chain 42, the product stacks will always be made to arrive in the space between adjacent pusher fingers on the infeed conveyor chain 98.

In operation, the products (cookies) arrive in metered fashion on the supply conveyor 14 so that a predetermined spacing exists between adjacent products. This spacing corresponds with the spacing between adjacent product platens 68 on the stacker conveyor 40 as does the length dimension of the product platen. As such, as the products are intercepted by the ascending flight 50 of the stacking conveyor 40, alternate products will be engaged by the product platens 68 while the remaining products continue to ride upon the infeed band or belt pairs 16 and 18. In this fashion, one product will be elevated to a height h while the following product remains at a lower disposition riding upon the belt pairs 16 and 18. An arriving elevated product is deposited momentarily upon the space-apart deadplate members 76 and 78 where it remains until the next following pusher finger 72 engages that product to continue pushing the uppermost product to the right when viewed in FIG. 2. At the same time, however, it will be observed that the product residing at the lower elevation, i.e., upon the stacker conveyor belt 56 itself, will become positioned beneath the product then on the deadplate and the two will be moved in unison to the right until the uppermost product reaches the end of the deadplate 74 and falls onto the upper surface of the lower product being carried beneath it.

As the stack of two products continues to move rightward, the descending flight of the stacker conveyor 54 will no longer support the stacked products and the products will be carried further to the right by virtue of riding upon the discharge conveyor belts 82 and 84.

As already mentioned, the discharge conveyor functions to time the arrival of the product stacks with the flight segments between adjacent pusher fingers on the wrapper's infeed conveyor 98. Once so intercepted by the infeed conveyor chain, the products are carried into the high-speed wrapper (not shown) where they are wrapped in a flexible plastic or paper wrapping material.

While the embodiment shown schematically in FIGS. 1 and 2 allows for the stacking of products only two high, those skilled in the art can appreciate that, by adding further deadplates at predetermined height elevations above the deadplate 74 and by providing additional product platens of increasingly greater predetermined heights on the stacker conveyor 40, the same principal may be used to generate a stack which is three or more products high. That is to say, it is only a matter of properly positioning product platens of different heights on the stacker conveyor 40 and providing the requisite number of vertically spaced deadplates that sequential products may be lifted onto deadplate steps of increasing height followed by a pusher finger which can be used to sweep the completed stack of a desired height from the shelves and onto the descending flight 54 of the stacking conveyor 40. Deadplate or shelves 76 and 78 can be hinged or otherwise designed for quick removal, which allows for quick changeover so that only a one-high product would be presented to wrapper's infeed.

So as not to confuse the drawings and thereby obfuscate the invention, the drive motor and transmission members associated with the supply conveyor 14, the stacker conveyor 40 and the discharge conveyor 80 are not shown. It is felt that persons of ordinary skill in the conveyor art can readily visualize how the various conveyor sections are to be driven from a common motor or by separate servo controlled motors from what has been particularly disclosed and set out herein.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. Apparatus for stacking products one atop the other comprising:
   (a) a feed conveyor having a generally horizontally flight for receiving products thereon at an input station and transporting same in serial order toward a stacking station, said stacking station including a plurality of deadplates positioned in parallel and spaced-apart vertical relation to one another;
   (b) a stacking conveyor comprising a driven endless belt trained over a plurality of rollers defining, in order, an ascending flight, a horizontal flight and a descending flight in the direction of travel of said endless belt, said stacking conveyor being in general longitudinal alignment with said feed conveyor and carrying a plurality of platen members of predetermined heights corresponding to the heights of said deadplates above said second horizontal flight of said stacking conveyor and with a predetermined spacing therebetween such that successive products being carried by said feed conveyor are received on successive ones of said platen members as said ascending flight intercepts the horizontal flight of said feed conveyor and are lifted onto a respective one of said deadplates;
   (c) a discharge conveyor comprising an endless belt trained over a plurality of rollers to define a generally horizontal flight intersected by said descending flight of said stacking conveyor for carrying products away from said stacking station; and (d) pusher means carried by predetermined ones of said platen members for simultaneously pushing product from said plurality of deadplates onto said horizontal flight of said discharge conveyor in a vertically stacked relationship.

2. The apparatus as in claim 1 wherein each of said platen members includes a plurality of contiguous block-like elements of a length dimension sufficiently small to traverse a semicircular segment of said plurality of rollers, said block-like elements being attached to said driven endless belt.

3. The apparatus as in claim 2 wherein said pusher means is carried by the leading one of said block-like elements in the direction of travel of said platen members on selectetd ones of said platen members.

4. The apparatus as in claim 3 wherein said pusher means are of a length at least as great as the vertical height of the uppermost one of said plurality of deadplates.

5. The apparatus as in claim 1 wherein said ascending flight is at an angle of between three to ten degrees with respect to said horizontal flight.

* * * * *